United States Patent [19]

Takita et al.

[11] Patent Number: 5,051,183

[45] Date of Patent: Sep. 24, 1991

[54] MICROPOROUS POLYOLEFIN MEMBRANE AND METHOD OF PRODUCING SAME

[75] Inventors: Kotaro Takita; Koichi Kono; Tatsuya Takashima; Kenkichi Okamoto, all of Saitama, Japan

[73] Assignee: Tonen Corporation, Tokyo, Japan

[21] Appl. No.: 585,461

[22] Filed: Sep. 20, 1990

[51] Int. Cl.$^5$ .................. B01D 67/00; B01D 71/26
[52] U.S. Cl. .................. 210/500.36; 264/41; 264/164; 264/210.1; 264/288.4
[58] Field of Search ............ 264/344, 41, 164, 210.2, 264/210.3, 210.4, 211.9, 233, 288.8, 288.4, 289.3, 289.6, 290.2, DIG. 48, DIG. 67, 210.1; 210/500.36

[56] References Cited

U.S. PATENT DOCUMENTS 4,873,034  10/1989  Kono et al. .................. 264/344

FOREIGN PATENT DOCUMENTS

| 58-5228 | 1/1983 | Japan . |
| 60-242035 | 12/1985 | Japan . |
| 61-195132 | 8/1986 | Japan . |
| 61-195133 | 8/1986 | Japan . |
| 63-39602 | 2/1988 | Japan . |
| 63-273651 | 11/1988 | Japan . |

*Primary Examiner*—Frank Sever
*Attorney, Agent, or Firm*—Armstrong, Nikaido, Marmelstein, Kubovcik & Murray

[57] ABSTRACT

A microporous polyolefin membrane made of a polyolefin composition containing 1 weight % or more of an ultra-high-molecular-weight polyolefin having a weight-average molecular weight of $7 \times 10^5$ or more and having a weight-average molecular weight/number-average molecular weight ratio of 10-300, the microporous membrane having a thickness of 0.1-25 μm, a porosity of 35-95%, an average pore diameter of 0.001-0.2 μm and a breaking strength of 0.2 kg or more per 15 mm width is produced by (a) preparing a solution comprising 10-50 weight % of the polyolefin composition and 50-90 weight % of a solvent; (b) extruding the solution through a die; (c) cooling the extruded solution to form a gel-like article; (d) stretching the gel-like article at a temperature equal to or lower than a melting point of the polyolefin composition +10° C; and (e) removing the remaining solvent.

10 Claims, No Drawings

MICROPOROUS POLYOLEFIN MEMBRANE AND METHOD OF PRODUCING SAME

BACKGROUND OF THE INVENTION

The present invention relates to a microporous membrane of a polyolefin composition containing an ultra-high-molecular-weight polyolefin, and a method for efficiently producing such a microporous membrane.

Microporous membranes are widely used in various applications such as battery separators, electrolytic capacitor separators, various filters, moisture-permeable, waterproof clothes, reverse osmosis membranes, ultrafiltration membranes, microfiltration membranes, etc.

Microporous polyolefin membranes are conventionally produced by various processes. One example of such processes is an extraction process comprising the steps of mixing a polyolefin with a pore-forming agent such as fine powder of different polymers in such a manner as to achieve micro-dispersion and subsequently extracting the dispersed pore-forming agent. Another process is a phase separation process by which polyolefin is divided into fine phases by a solvent, thereby forming a porous structure. Further, there is a drawing process comprising the steps of forming a polyolefin article containing solid fillers finely dispersed therein and imparting a strain to the article by drawing to break the interfaces between the polymer phase and the solid fillers, thereby forming pores in the article. In these processes, however, polyolefins having a molecular weight lower than 500,000 are usually used, so that the thinning and strengthening of membranes by drawing are limited.

Recently, there has been developed an ultra-high-molecular-weight polyolefin which can be formed into a high-strength, high-modulus membrane. With this development, there have been proposed various processes for producing a high-strength microporous membrane from it.

One of such processes is disclosed in, for example, Japanese Patent Laid-Open No. 58-5228. According to this process, an ultra-high-molecular-weight polyolefin is dissolved in a nonvolatile solvent and the resulting solution is made into a gel in the form of fiber or membrane. The solvent-containing gel is subjected to an extraction treatment with a volatile solvent and then stretched while heating. This process is, however, disadvantageous in that the gel cannot be biaxially oriented at a high draw ratio because it has a porous structure highly swollen with a nonvolatile solvent. The resulting membrane has a low strength and a large pore diameter on account of its reticulate structure which easily expands and breaks. Another disadvantage of this process is that the gel in the form of a membrane is liable to warpage because of uneven evaporation of the volatile solvent. Further, it cannot be subjected to orientation at a high draw ratio because of the shrinkage and compaction of the reticulate structure of the gel which take place after the extraction of the nonvolatile solvent by a volatile solvent.

Various attempts have been proposed to produce a microporous membrane of an ultra-high-molecular-weight polyolefin (polyethylene) by forming a gel-like sheet from a heated solution of an ultra-high-molecular-weight polyolefin having a weight-average molecular weight of $5 \times 10^5$ or more, controlling a solvent amount in the gel-like sheet by a solvent-removing treatment, and then stretching it while heating thereby removing the remaining solvent.

Japanese Patent Laid-Open No. 60-242035 discloses a process for producing a microporous ultra-high-molecular-weight polyethylene membrane having a thickness of 10 µm or less, a breaking strength of 200 kg/cm² or more, and a void volume of 30% or more by dissolving ultra-high-molecular-weight polyethylene having a weight-average molecular weight of $5 \times 10^5$ or more in a solvent while heating, forming a gel-like sheet from the resulting solution, removing a solvent from the gel-like sheet until the solvent content decreases to 10-80 weight %, and then stretching the sheet while heating, thereby removing a residual solvent.

Japanese Patent Laid-Open No. 61-195132 discloses a method of producing a microporous membrane by forming a gel-like article from a solution of an α-olefin polymer having a weight-average molecular weight of $5 \times 10^5$ or more, removing at least 10 weight % of a solvent from the gel-like article so that the α-olefin polymer content in the gel-like article becomes 10-90 weight %, stretching it at a temperature equal to or lower than a melting point of the α-olefin polymer + 10° C., and removing the remaining solvent from the resulting stretched article.

Japanese Patent Laid-Open No. 61-195133 discloses a microporous membrane made of an α-olefin polymer having a weight-average molecular weight of $5 \times 10^5$ or more and having an average pore diameter of 0.001–1 µm and a porosity of 30–90%, which is stretched two times or more in one direction at an areal stretching ratio of 20 times or more.

Japanese Patent Laid-Open No. 63-39602 discloses a method of producing a microporous polyethylene membrane having a pure water permeability of 100 l/m²·hr·atm or more and a γ-globulin block ratio of 50% or more, which comprises forming a gel-like article from a solution of polyethylene having a weight-average molecular weight of $5 \times 10^5$ or more, removing a solvent from the gel-like article so that the solvent content in the gel-like article becomes more than 80 weight % and 95 weight % or less, stretching it two times in one direction and 20 times or more in an areal ratio at a temperature of 120° C. or lower, and removing the remaining solvent from the resulting stretched article. This microporous polyethylene membrane is excellent in water permeability and suitable for separating proteins, etc. because of its fine pores.

Further, Japanese Patent Laid-Open No. 63-273651 discloses a method of producing a microporous membrane by preparing a solution of an ultra-high-molecular-weight polyolefin having a weight-average molecular weight of $5 \times 10^5$ or more, extruding the solution through a die while rapidly cooling the solution to a gelation temperature or lower, so that an ultra-high-molecular-weight polyolefin content in the gel-like article becomes 10–90 weight %, stretching it at a temperature equal to or lower than a melting point of the ultra-high-molecular-weight polyolefin + 10° C., and then removing the remaining solvent. This method can provide a microporous membrane having a thickness of 10 µm or more, which is suitable for applications requiring large strength and pressure resistance.

However, in any of the above methods, since the ultra-high-molecular-weight polyolefin is biaxially oriented, a diluted solution of polyolefin should be prepared. Accordingly, the ultra-high-molecular-weight polyolefin solution suffers from large swelling and neck-in at the exit of a die, resulting in the difficulty of sheet formation. Further, since the resulting sheet contains an excess amount of a solvent, mere stretching fails to provide a desired microporous membrane. Accordingly, a solvent-removing treatment is necessary to control the solvent content in the sheet before stretching, meaning that the productivity of a microporous membrane is relatively low.

OBJECT AND SUMMARY OF THE INVENTION

Accordingly, an object of the present invention is to provide a microporous polyolefin membrane having good stretchability and made from a high-concentration polyolefin composition solution.

Another object of the present invention is to provide a method for efficiently producing a microporous membrane from a high-concentration polyolefin composition solution containing an ultra-high-molecular-weight polyolefin.

To achieve the above-mentioned objects, the present inventors have carried out intense research, which has led to the finding that it is possible to form a high-concentration solution by using a polyolefin composition containing an ultra-high-molecular-weight polyolefin in such an amount that a weight-average molecular weight/number-average molecular weight ratio of the polyolefin composition is in a desired range, and that a microporous polyolefin membrane having excellent properties can be efficiently produced from this solution. The present invention has been completed on the basis of this finding.

Thus, the microporous polyolefin membrane according to the present invention is made of a polyolefin composition containing 1 weight % or more of an ultra-high-molecular-weight polyolefin having a weight-average molecular weight of $7 \times 10^5$ or more and having a weight-average molecular weight/number-average molecular weight ratio of 10–300, the microporous membrane having a thickness of 0.1–25 $\mu$m, a porosity of 35–95%, an average pore diameter of 0.001–0.2 $\mu$m and a breaking strength of 0.2 kg or more per 15 mm width.

The method of producing a microporous polyolefin membrane according to the present invention comprises the steps of:

(a) preparing a solution comprising 10–50 weight % of a polyolefin composition containing 1 weight % or more of an ultra-high-molecular-weight polyolefin having a weight-average molecular weight of $7 \times 10^5$ or more and having a weight-average molecular weight/number-average molecular weight ratio of 10–300, and 50–90 weight % of a solvent;

(b) extruding the solution through a die;

(c) cooling the extruded solution to form a gel-like article;

(d) stretching the gel-like article at a temperature equal to or lower than a melting point of the polyolefin composition + 10° C.; and (e) removing the remaining solvent.

DETAILED DESCRIPTION OF THE INVENTION

The microporous polyolefin membrane of the present invention is made of a polyolefin composition containing 1 weight % or more of an ultra-high-molecular-weight polyolefin having a weight-average molecular weight of $7 \times 10^5$ or more and having a weight-average molecular weight/number-average molecular weight ratio of 10–300.

A weight-average molecular weight/number-average molecular weight ratio of the polyolefin composition is 10–300, preferably 12–250. When it is less than 10, the polyolefin composition has large average molecular chain length, resulting in an excessively high density of entanglement of molecular chains when dissolved. Accordingly, it is difficult to prepare a high-concentration polymer solution. On the other hand, when the ratio exceeds 300, lower molecular weight components tend to be cut when stretched, resulting in the decrease in the overall strength of the resulting membrane.

Incidentally, the weight-average molecular weight/number-average molecular weight ratio is a measure of a molecular weight distribution, and the larger this molecular weight ratio, the wider the molecular weight distribution. In the polyolefin composition comprising polyolefins having different weight-average molecular weights, the larger the ratio of molecular weights in the composition, the larger the difference of weight-average molecular weights of polyolefins, and vice versa.

In the present invention, the ratio of weight-average molecular weight/number-average molecular weight of the polyolefin composition is 10–300, larger than the weight-average molecular weight/number-average molecular weight ratio of ultra-high-molecular-weight polyolefin itself (usually about 6). As a result, the molecular weight distribution of the polyolefin composition expands toward a lower molecular weight region, making it possible to prepare a high-concentration polyolefin solution.

Such polyolefin composition of the present invention can be prepared by mixing an ultra-high-molecular-weight polyolefin having a weight-average molecular weight of $7 \times 10^5$ or more with a polyolefin having a weight-average molecular weight of less than $7 \times 10^5$ in such a proportion that a ratio of weight-average molecular weight/number-average molecular weight of the resulting composition is within the above range.

The ultra-high-molecular-weight polyolefin that can be used in the present invention is one which has a weight-average molecular weight of $7 \times 10^5$ or more, preferably in the range of $1 \times 10^6$ to $15 \times 10^6$. With a weight-average molecular weight lower than $7 \times 10^5$, the composition has low maximum stretching (draw) ratio, failing to provide a desired microporous membrane. Although there is no upper limit in molecular weight, polyolefins having a molecular weight in excess of $15 \times 10^6$ are poor in formability of their gel-like articles.

Examples of such ultra-high-molecular-weight polyolefins include crystalline homopolymers or copolymers of ethylene, propylene, 1-butene, 4-methyl-1-pentene, 1-hexene, etc. Preferable among them is ultra-high-molecular-weight polyethylene, particularly ultra-high-molecular-weight, high-density polyethylene.

The content of the ultra-high-molecular-weight polyolefin in the polyolefin composition is 1 weight % or more per 100 weight % of the polyolefin composition. When the content of the ultra-high-molecular-weight polyolefin is less than 1 weight %, the entanglement of molecular chains contributing to the improvement of stretchability does not take place, failing to provide a high-strength microporous membrane. On the other hand, the upper limit of the ultra-high-molecularweight polyolefin content is not particularly limited, but when it exceeds 90 weight %, the desired high-concentration polyolefin solution cannot be obtained.

Other polyolefins than the ultra-high-molecular-weight polyolefin in the polyolefin composition are those having weight-average molecular weights of less than $7 \times 10^5$. As a lower limit of the molecular weight, it is preferably $1 \times 10^4$ or more. When a polyolefin having a weight-average molecular weight of less than $1 \times 10^4$ is used, rupture is likely to take place when stretched, failing to provide a desired microporous membrane. Particularly, the polyolefin having a weight-average molecular weight of $1 \times 10^5$ or more and less than $7 \times 10^5$ is preferably added to the ultra-high-molecular-weight polyolefin.

As such polyolefins, the same types of polyolefins as the above ultra-high-molecular-weight polyolefin can be used, and particularly high-density polyethylene, which is a polymer based on ethylene, is preferable.

Incidentally, the above-mentioned ultra-high-molecular-weight polyolefin may be incorporated with various additives such as antioxidants, ultraviolet absorbers, slip agents, antiblocking agents, pigments, dyes, inorganic fillers, etc., if required, within limits not harmful to the object of the present invention.

The method of producing the microporous polyolefin membrane according to the present invention will be explained below.

In the present invention, the high-concentration solution of the polyolefin composition is prepared by dissolving the above-mentioned polyolefin composition in a solvent while heating. The solvent is not specifically limited so long as it is capable of dissolving the polyolefin composition. Examples of the solvents include aliphatic or cyclic hydrocarbons such as nonane, decane, undecane, dodecane, paraffin oils, etc., and fractions of mineral oils having boiling points substantially equal to those of these hydrocarbons. Nonvolatile solvents such as paraffin oils are desirable to obtain the gel-like articles in which the solvent content is stable.

Dissolution of the polyolefin composition while heating should be carried out by stirring its solution at a temperature at which it is completely dissolved in a solvent. The dissolving temperature varies depending on the types of polymers and solvents used. It is generally in the range of 140°–250° C. in the case of polyethylene composition. The concentration of the polyolefin composition solution is preferably 10-50 weight %, preferably 10-40 weight %. When the concentration is less than 10 weight %, a large amount of a solvent has to be used, and swelling and neck-in are likely to take place at the exit of a die in the process of forming sheets. Accordingly, it is difficult to produce large sheets. On the other hand, when the concentration exceeds 50 weight %, it is difficult to prepare a uniform solution. Incidentally, it is desirable to add an antioxidant to the solution to protect the polyolefin from degradation by oxidation.

Next, a heated solution of this polyolefin composition is extruded through a die. Usually used as a die is a sheet die having a rectangular orifice, but a hollow die having a circular orifice, an inflation die, etc. may be used. When the sheet die is used, a die gap is usually 0.1-5 mm, and heated at 140°–250° C. in the extrusion process. In this case, an extrusion speed is usually 20-30 cm/minute to 2-3 m/minute.

The solution extruded through the die is formed into a gel-like article by cooling. The cooling is preferably conducted to a gelation temperature or lower at a speed of 50° C./minute or more. When the cooling speed is too low, the crystallization degree of the gel-like article increases, unsuitable for stretching. As a method of cooling, direct contact with cooling air, cooling water and other cooling media, contact with a roll cooled by a coolant, etc. may be employed. The solution extruded through a die may be drawn at a take-up ratio of 1-10, preferably 1-5 before or after cooling. When the take-up ratio is more than 10, neck-in is likely to take place, undesirably causing the breakdown of the sheet when stretched.

The gel-like article is then subjected to an orientation (stretching) treatment at a predetermined draw ratio while heating. Orientation is accomplished by an ordinary method such as a tenter method, a roll method, an inflation method, a calendering method, or a combination thereof. Biaxial orientation is desirable. It may be carried out by stretching the sheet in longitudinal and transverse directions simultaneously or sequentially, and simultaneous biaxial orientation is more preferable.

The orientation temperature should be equal to or lower than a temperature which is 10° C. above the melting point of the ultra-high-molecular-weight polyolefin, preferably in the range from the crystal dispersion temperature to the crystal melting point. In the case of polyethylene, it is 90°–140° C., preferably 100°–130° C. If the orientation temperature is higher than the melting point plus 10° C., the molecular orientation does not take place because the resin melts. If the orientation temperature is lower than the crystal dispersion temperature, the membrane tends to break on account of the insufficient softening of the resin, and the membrane cannot be oriented at a high draw ratio.

The draw ratio varies depending on the thickness of the original membrane. The linear draw ratio in one horizontal (longitudinal or transverse) direction should be greater than twofold, preferably 3- to 20-fold, and the areal draw ratio should be greater than tenfold, preferably 20- to 400-fold. With an areal draw ratio smaller than 10-fold, the resulting microporous membrane lacks high modulus and high strength on account of insufficient orientation. On the other hand, with an areal draw ratio in excess of 400-fold, difficulties exist in the orientation operation.

The thus oriented product is subjected to a solvent-removing treatment. Solvents used for this solvent-removing treatment may be highly volatile solvents including hydrocarbons such as pentane, hexane, heptane, etc.; chlorinated hydrocarbons such as methylene chloride and carbon tetrachloride; fluorinated hydrocarbons such as trifluoroethane; and ethers such as diethyl ether and dioxane. These volatile solvents may be used individually or in combination, and their selection depends on the types of the nonvolatile solvents used to dissolve the ultra-high-molecular-weight polyolefin. Washing methods with these solvents include an extraction method with solvents, a method of spraying solvents or a combination thereof.

The washing of the stretched article with a solvent should be performed to such an extent that the content of the residual solvent in the oriented product is less than 1 weight %. The stretched article is finally dried to remove the washing solvent by a heating method, an air-cooling method, etc. The dried article is desirably heat-set in a temperature range between the crystal dispersion temperature and the melting point.

The microporous ultra-high-molecular-weight polyolefin membrane produced as mentioned above has a porosity of 35-95% and an average pore diameter of 0.001-0.2 µm, and a breaking strength of 0.2 kg or more per 15 mm width. The thickness of the microporous polyolefin membrane may vary depending upon its applications, but it is generally 0.1-25 µm, preferably 2-20 µm.

Incidentally, the resulting microporous polyolefin membrane is, if necessary, subjected to a hydrophilic treatment by plasma irradiation, impregnation with surfactant, surface grafting, etc.

The present invention will be explained in further detail by the following Examples. The test methods used in Examples are as follows:

(1) Weight-average molecular weight and molecular weight distribution: Measured by gel permeation chromatography (GPC) method at 135° C. at a flow rate of 1.0 ml/minute by a GPC apparatus manufactured by Waters whose column is GMH-6 manufactured by Tosoh Corporation, using o-dichlorobenzene as a solvent.

(2) Membrane thickness: Determined by measuring a cross section of a microporous membrane by a scanning electron microscope.

(3) Tensile breaking strength: Measured according to ASTM D882, and expressed in term of load at a break point for a 15-mm-wide specimen.

(4) Air permeability: Measured according to JIS P8117.

(5) Water permeability: Expressed in terms of the amount of filtrate which passed through the hydrophilicized microporous membrane under a hydraulic pressure of 380 mmHg. The hydrophilicization was accomplished by passing a 50/50 (by volume) mixture of distilled water and ethanol through the microporous membrane set in a flat module, followed by thorough washing with water.

(6) Average pore diameter: Expressed in terms of the concentration of pullulan (manufactured by Showa Denko K. K.) contained in a filtrate which passed through the microporous membrane under the differential pressure of 380 mmHg when a 0.05 weight % aqueous solution of pullulan was circulated in the module mentioned in (5) above. The concentration of pullulan was determined by differential refractometry. The ratio of blocking pullulan was calculated by the following formula:
Ratio of blocking pullulan $= (1 - A/B) \times 100$ where A is the concentration of pullulan in the filtrate and B is the concentration of pullulan in the original solution.

High-molecular polymer chains in the solution are like spherically entangled yarns whose diameter d, relative to a mean-square distance $[\gamma^2]$ of both ends of a molecular chain, is approximately expressed as follows:

$$[d/2]^2 = [\gamma^2] \quad (1)$$

According to the Florry theory concerning a viscosity and expansion of molecular chains in a high-molecular polymer solution, $$[\eta]M = 2.1 \times 10^{21} [\gamma^2]^{3/2} \quad (2)$$

is satisfied regardless of types of high-molecular polymers. Accordingly, by the equations (1) and (2), the diameter d of linear, high-molecular polymer can be calculated from the measured value of $[\eta]$ and a molecular weight M at which the block ratio is 50%. This d was used as an average pore diameter of a microporous polyethylene membrane.

EXAMPLE 1

A polyethylene composition solution was prepared from a resin material (Mw/Mn=16.8) consisting of 2 parts by weight of ultra-high-molecular-weight polyethylene having a weight-average molecular weight (Mw) of $2.5 \times 10^6$ and 8 parts by weight of polyethylene having a weight-average molecular weight of $6.8 \times 10^5$, and 90 parts by weight of liquid paraffin (64 cSt at 40° C.), and an antioxidant composed of 0.125 parts by weight of 2,6-di-tert-butyl-p-cresol ("BHT," manufactured by Sumitomo Chemical Industries Co., Ltd.) and 0.25 parts by weight of tetrakis [methylene-3-(3,5-di-tert-butyl-4-hydroxylphenyl)-propionate] methane ("Irganox 1010," manufactured by Ciba Geigy) were added to 100 parts by weight of the resulting polyethylene composition solution. The mixture was introduced into an autoclave equipped with a stirrer and stirred to give a uniform solution.

The solution was fed to an extruder of 45 mm in diameter and extruded from a T-die and taken up by a cooling roll as a gel-like sheet.

This sheet was subjected to simultaneous biaxial orientation by a biaxial stretching machine at 115° C., at a draw speed of 0.5 m/min and at a draw ratio of 7×7. The resulting oriented membrane was washed with methylene chloride to remove residual liquid paraffin and then dried. Thus there was obtained a microporous membrane of a polyethylene composition having a thickness of 4 µm. The properties of the microporous membrane are shown in Table 1.

EXAMPLE 2

A 5-µm-thick, microporous membrane of a polyethylene composition was prepared in the same manner as in Example 1 except that a resin material (Mw/Mn=16.7) consisting of 2 parts by weight of ultra-high-molecular-weight polyethylene having a weight-average molecular weight (Mw) of $2.5 \times 10^6$ and 13 parts by weight of polyethylene having a weight-average molecular weight of $2.4 \times 10^5$, and 85 parts by weight of liquid paraffin were used to prepare a polyethylene composition solution. The properties of the microporous membrane are shown in Table 1.

EXAMPLE 3

A 4-µm-thick, microporous membrane of a polyethylene composition was prepared in the same manner as in Example 1 except that a resin material (Mw/Mn=190) consisting of 2 parts by weight of ultra-high-molecular-weight polyethylene having a weight-average molecular weight (Mw) of $2.5 \times 10^6$ and 13 parts by weight of polyethylene having a weight-average molecular weight of $4.1 \times 10^5$, and 85 parts by weight of liquid paraffin were used to prepare a polyethylene composition solution. The properties of the microporous membrane are shown in Table 1.

EXAMPLE 4

A 16-µm-thick, microporous membrane of a polyethylene composition was prepared in the same manner as in Example 1 except that a resin material (Mw/Mn=150) consisting of 1 part by weight of ultra-high-molecular-weight polyethylene having a weight-average molecular weight (Mw) of $2.5 \times 10^6$ and 19 parts by weight of polyethylene having a weight-average molecular weight of $4.1 \times 10^5$, and 80 parts by weight of liquid paraffin were used to prepare a polyethylene composition solution. The properties of the microporous membrane are shown in Table 1.

EXAMPLE 5

A 12-μm-thick, microporous membrane of a polyethylene composition was prepared in the same manner as in Example 1 except that a resin material (Mw/Mn=240) consisting of 1 part by weight of ultra-high-molecular-weight polyethylene having a weight-average molecular weight (Mw) of $2.5 \times 10^6$ and 39 parts by weight of polyethylene having a weight-average molecular weight of $3.5 \times 10^5$, and 60 parts by weight of liquid paraffin were used to prepare a polyethylene composition solution. The properties of the microporous membrane are shown in Table 1.

COMPARATIVE EXAMPLE 1

A membrane of polyethylene was prepared in the same manner as in Example 1 except that 12 parts by weight of polyethylene having a weight-average molecular weight (Mw) of $6.8 \times 10^5$ (Mw/Mn=8.0) and 88 parts by weight of liquid paraffin were used to prepare a polyethylene solution. However, orientation could not be achieved at a high draw ratio, failing to provide a microporous polyethylene membrane.

COMPARATIVE EXAMPLE 2

A microporous membrane of a polyethylene composition was prepared in the same manner as in Example 1 except that a resin material (Mw/Mn=350) consisting of 2 parts by weight of ultra-high-molecular-weight polyethylene having a weight-average molecular weight (Mw) of $2.5 \times 10^6$ and 13 parts by weight of polyethylene having a weight-average molecular weight (Mw) of $5.9 \times 10^5$, and 85 parts by weight of liquid paraffin were used to prepare a polyethylene composition solution. However, a microporous membrane thus obtained (thickness: 10 μm) had poor breaking strength.

COMPARATIVE EXAMPLE 3

12 parts by weight of ultra-high-molecular-weight polyethylene having a weight-average molecular weight (Mw) of $2.5 \times 10^6$ (Mw/Mn=6.0) was added to 88 parts by weight of liquid paraffin to prepare a polyethylene solution. However, a uniform solution could not be prepared.

COMPARATIVE EXAMPLE 4

A membrane of a polyethylene composition was prepared in the same manner as in Example 1 except that a resin material (Mw/Mn=120) consisting of 0.2 parts by weight of ultra-high-molecular-weight polyethylene having a weight-average molecular weight (Mw) of $2.5 \times 10^6$ and 24.8 parts by weight of polyethylene having a weight-average molecular weight of $3.5 \times 10^5$, and 75 parts by weight of liquid paraffin were used to prepare a polyethylene composition solution. However, the resulting polyethylene composition membrane was frequently ruptured when stretching, failing to provide a microporous membrane.

COMPARATIVE EXAMPLE 5

A resin material (Mw/Mn=14.5) consisting of 2 parts by weight of ultra-high-molecular-weight polyethylene having a weight-average molecular weight (Mw) of $2.5 \times 10^6$ and 58 parts by weight of polyethylene having a weight-average molecular weight of $2.4 \times 10^5$ was added to 40 parts by weight of liquid paraffin to prepare a polyethylene composition solution. However, a uniform solution could not be prepared.

TABLE 1

| | Example No. | | | | |
|---|---|---|---|---|---|
| | 1 | 2 | 3 | 4 | 5 |
| Polyolefin Composition | | | | | |
| Mw/Mn | 16.8 | 16.7 | 190 | 150 | 240 |
| Ultra-High-Molecular-Weight Polyethylene | | | | | |
| Mw ($\times 10^6$)[1] | 2.5 | 2.5 | 2.5 | 2.5 | 2.5 |
| Content | 20.0 | 13.3 | 13.3 | 5.0 | 2.5 |
| Other Polyethylene | | | | | |
| Mw ($\times 10^5$)[1] | 6.8 | 2.4 | 4.1 | 4.1 | 3.5 |
| Concentration in Solution[2] (Wt. %) | 10 | 15 | 15 | 20 | 40 |
| Stretching Conditions | | | | | |
| Stretching Temperature (°C.) | 115 | 115 | 115 | 115 | 115 |
| Stretching Ratio MD × TD (times) | 7 × 7 | 7 × 7 | 7 × 7 | 7 × 7 | 7 × 7 |
| Properties | | | | | |
| Thickness (μm) | 4 | 5 | 4 | 16 | 12 |
| Breaking Strength (kg/15 mm width) | 0.70 | 0.65 | 0.35 | 0.35 | 0.40 |
| Air Permeability (sec/100 cc) | 148 | 37 | 30 | 55 | 112 |
| Water Permeability[3] | 234 | 727 | 842 | 680 | 415 |
| Pore Diameter (μm) | 0.02 | 0.03 | 0.04 | 0.05 | 0.04 |

| | Comparative Example No. | | | | |
|---|---|---|---|---|---|
| | 1 | 2 | 3 | 4 | 5 |
| Polyolefin Composition | | | | | |
| Mw/Mn | 8.0 | 350 | 6.0 | 120 | 14.5 |
| Ultra-High-Molecular-Weight Polyethylene | | | | | |
| Mw ($\times 10^6$)[1] | — | 2.5 | 2.5 | 2.5 | 2.5 |

TABLE 1-continued

| | | | | | |
|---|---|---|---|---|---|
| Content | 0 | 13.3 | 100 | 0.8 | 3.3 |
| Other Polyethylene Mw ($\times 10^5$)[1] | 6.8 | 5.9 | — | 3.5 | 2.4 |
| Concentration in Solution[2] (Wt. %) | 12 | 15 | 12 | 25 | 60 |
| Stretching Conditions | | | | | |
| Stretching Temperature (°C.) | — | 115 | — | 115 | — |
| Stretching Ratio MD × TD (times) | — | 7 × 7 | — | 7 × 7 | — |
| Properties | | | | | |
| Thickness (μm) | — | 10 | — | — | — |
| Breaking Strength (kg/15 mm width) | — | 0.12 | — | — | — |
| Air Permeability (sec/100 cc) | — | 108 | — | — | — |
| Water Permeability[3] | — | 530 | — | — | — |
| Pore Diameter (μm) | — | 0.05 | — | — | — |

As described above in detail, a polyolefin composition solution in as high a concentration as 10–50 weight % can be prepared according to the present invention. Accordingly, only a small amount of solvent is used, and the solvent content needs not be controlled in the gel-like sheet before stretching. Therefore, the microporous polyolefin membrane can be produced efficiently. In addition, a gel-like sheet extruded for the production of a sheet does not substantially suffer from swelling and neck-in.

The microporous membrane of the present invention had a high strength and is excellent in handling and working when laminated with an unwoven fabric. Further, since it has good water permeability, it can efficiently separate out fractions having molecular weights of several tens of thousand to several hundreds of thousand.

Such microporous polyolefin membrane is suitable for battery separators, electrolytic capacitor separators, ultrafiltration membranes, microfiltration membranes, various filters, moisture-permeable, waterproof clothes, etc.

The present invention has been described by the above Examples, but it should be noted that any modifications can be made unless they deviate from the scope of the present invention defined by the claims attached hereto.

What is claimed is:

1. A microporous polyolefin membrane made of a polyolefin composition comprising 1 to 90 weight % per 100 weight % of the polyolefin composition of an ultra-high-molecular-weight polyolefin having a weight-average molecular weight of $7 \times 10^5$ or more and a polyolefin having a weight-average molecular weight of between $1 \times 10^4$ to less than $7 \times 10^5$, said polyolefin composition having a weight-average molecular weight/number-average molecular weight ratio of 10–300, said microporous membrane having a thickness of 0.1–25 μm, a porosity of 35–95%, an average pore diameter of 0.001–0.02 μm and a breaking strength of 0.2 kg or more per 15 mm width.

2. The microporous polyolefin membrane according to claim 1, wherein said ultra-high-molecular-weight polyolefin is ultra-high-molecular-weight polyethylene, and another component in said polyolefin composition is a polymer mainly composed of ethylene and having a weight-average molecular weight of $1 \times 10^4$ or more and less than $7 \times 10^5$.

3. A method of producing a microporous polyolefin membrane comprising the steps of:
   (a) preparing a solution comprising 10–50 weight % of a polyolefin composition comprising 1 to 90 weight % per 100 weight % of the polyolefin composition of an ultra-high-molecular-weight polyolefin having a weight-average molecular weight of $7 \times 10^5$ or more and a polyolefin having a weight-average molecular weight of between $1 \times 10^4$ to less than $7 \times 10^5$, said polyolefin composition having a weight-average molecular weight/number average molecular weight ratio of 10–300, and 50–90 weight % of a solvent;
   (b) extruding said solution through a die;
   (c) cooling said extruded solution to form a gel-like article;
   (d) stretching said gel-like article at a temperature equal to or lower than a melting point of said polyolefin composition + 10° C.; and
   (e) removing the remaining solvent.

4. The method according to claim 3, wherein said solution is cooled at a rate of 50° C./min or more.

5. The method according to claim 3, wherein said gel-like article is oriented at a temperature between a crystal dispersion temperature of said composition and a crystal melting point of said composition.

6. The method according to claim 3, wherein a solvent in said polyolefin solution is a nonvolatile solvent.

7. The method according to claim 6, wherein said nonvolatile solvent is paraffin oil.

8. The method according to claim 3, wherein the remaining solvent is removed by extraction with a volatile solvent.

9. The method according to claim 3, wherein said ultra-high-molecular-weight polyolefin is ultra-high-molecular-weight polyethylene, and another component in said polyolefin composition is a polymer mainly composed of ethylene and having a weight-average molecular weight of $1 \times 10^4$ or more and less than $7 \times 10^5$.

10. A microporous polyolefin membrane made in accordance with the method of claim 3.

* * * * *